United States Patent
Adair, Jr. et al.

(10) Patent No.: US 7,219,483 B2
(45) Date of Patent: May 22, 2007

(54) HEAT SEAL DIE AND SYSTEM AND METHOD FOR PORTION CONTROL SIZED PACKAGING

(75) Inventors: James Robert Adair, Jr., Atlanta, GA (US); William B. Bower, Palo Alto, CA (US); Edward Joseph Cigallio, Douglasville, GA (US); Richard Vincent Dougherty, Douglasville, GA (US)

(73) Assignee: Printpack Illinois, Inc., Elgin, IL (US)

( * ) Notice: Subject to any disclaimer, the term of this patent is extended or adjusted under 35 U.S.C. 154(b) by 254 days.

(21) Appl. No.: 09/954,443

(22) Filed: Sep. 17, 2001

(65) Prior Publication Data

US 2003/0051441 A1   Mar. 20, 2003

(51) Int. Cl.
*B65B 51/14* (2006.01)
(52) U.S. Cl. ............... 53/451; 53/370.7; 53/373.7; 53/551
(58) Field of Classification Search ............... 53/370.7, 53/370.8, 370.9, 373.7, 373.8, 373.9, 450, 53/451, 550, 551; 156/380.1, 380.4, 530, 156/581, 274.4, 309.6, 433, 497, 498
See application file for complete search history.

(56) References Cited

U.S. PATENT DOCUMENTS

| | | | | |
|---|---|---|---|---|
| 3,228,170 A | * | 1/1966 | Eisenstadt | 53/554 |
| 3,315,801 A | * | 4/1967 | Lowry | 206/469 |
| 3,451,187 A | * | 6/1969 | Massey et al. | 53/451 |
| 3,677,329 A | * | 7/1972 | Kirkpatrick | 165/104.26 |
| 4,288,968 A | * | 9/1981 | Seko et al. | 53/550 |
| 4,582,555 A | | 4/1986 | Bower | |
| 4,630,429 A | * | 12/1986 | Christine | 53/479 |
| 4,845,926 A | * | 7/1989 | Davis | 53/451 |
| 4,869,048 A | * | 9/1989 | Boeckmann | 53/451 |
| 5,015,223 A | * | 5/1991 | Boeckmann | 493/194 |
| 5,029,430 A | * | 7/1991 | Davis | 53/141 |
| 5,067,302 A | * | 11/1991 | Boeckmann | 53/374.8 |
| 5,881,539 A | * | 3/1999 | Fukuda et al. | 53/526 |
| 6,301,859 B1 | * | 10/2001 | Nakamura et al. | 53/373.7 |

* cited by examiner

*Primary Examiner*—Louis K. Huynh
*Assistant Examiner*—Thanh Truong
(74) *Attorney, Agent, or Firm*—Sutherland Asbill & Brennan LLP

(57) ABSTRACT

This invention encompasses a heat seal die incorporating heat tube technology for controlling the variation of temperature across a heat seal die. The invention also encompasses a system and method for portion control size packaging of flowable liquid-containing condiments in a portion size in the range from 1 to 5 ounces using such a heat seal die.

14 Claims, 2 Drawing Sheets

HEAT SEAL DIE AND SYSTEM AND METHOD FOR PORTION CONTROL SIZED PACKAGING

TECHNICAL FIELD

This invention relates to heat seal dies used to form a heat seal between two heat sealable surfaces such as thermoplastic film. More particularly, this invention relates to heat seal dies for use in portion control sized packaging machines to form top and bottom seals of packages made from thermoplastic film.

BACKGROUND OF THE INVENTION

Flexible packaging such as thermoplastic film is commonly used in form/fill/seal equipment for packaging fluid material such as food products. In form/fill/seal systems, material is placed inside tubular thermoplastic film and the top and bottom of the tubular film is heat sealed with a heat seal die to encase the material. Condiments such as ketchup and mustard are often packaged this way.

Temperature variation across the length of the heat seal die can produce packages that leak fluid material or serum over a period of time. This phenomenon occurs when the sealing temperature of the end seal dies exceeds or falls below the sealing range of the material. These suspect packages may not be evident to the operator of the form/fill/seal machines since the temperature controller only senses the temperature on one small area of the die. This condition often results in contamination of entire boxes of packaged goods containing large numbers of individual packets of product. Therefore, there is a need for more reliable form/fill/seal equipment.

SUMMARY OF THE INVENTION

This invention encompasses a heat seal die incorporating heat tube technology for controlling the variation of temperature across a heat seal die. The invention also encompasses a system and method for portion control sized packaging using such a heat seal die.

DETAILED DESCRIPTION OF EMBODIMENTS

This invention encompasses a novel heat seal die and a novel system and method for making portion control sized packaged goods.

Figure 1:
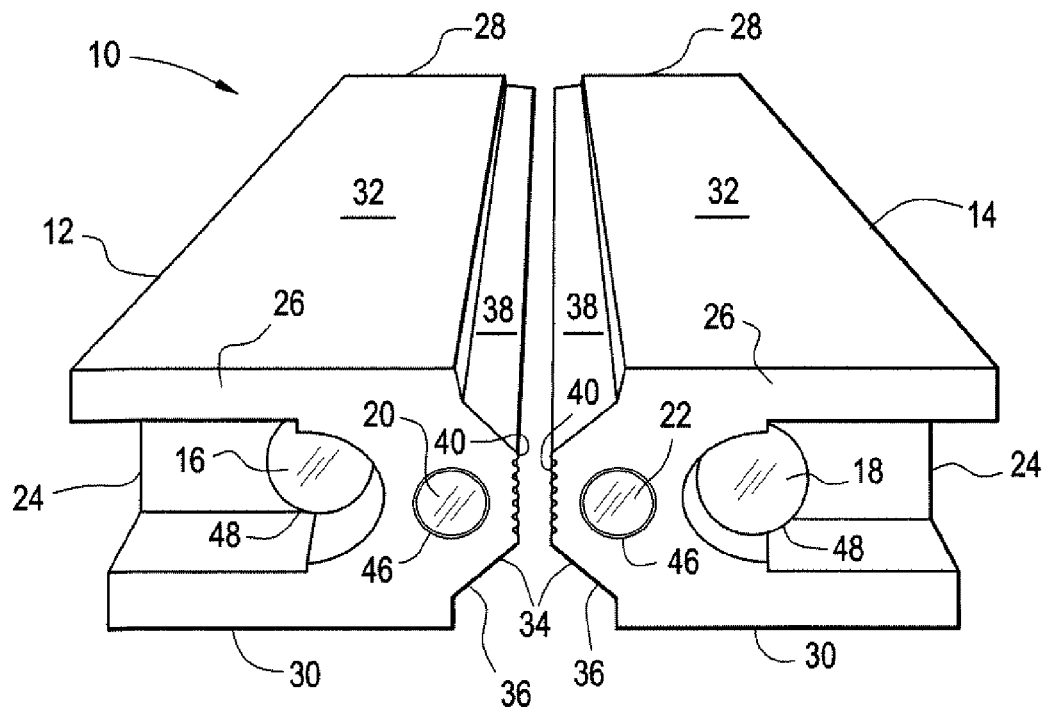
FIG. 1 is a perspective view of a heat seal die made according to an embodiment of this invention.

Turning to FIG. 1, a heat seal die 10 for forming a heat seal between two heat sealable surfaces such as a thermoplastic film or laminate comprising a heat sealable thermoplastic component is illustrated and generally comprises a first die member 12, a mating second die member 14, respective first and second heating elements 16 and 18 disposed in the first and second die members, and respective first and second heat tubes 20 and 22 disposed in the first and second die members.

Each of the first and second die members 12 and 14 comprise a body 24 made of rigid heat conducting material such as metal. A wide variety of metals can be used to form the die member body 24, but 440 stainless steel is particularly preferred because of its hardness and wear resistance.

The die member body 24 extends from a first end 26 to a second end 28 along a longitudinal axis. First and second opposing side members 30 and 32 extend from a first end 26 to the second end and a raised portion 34 extends from between the first and second longitudinal sides. The raised portion 34 has sloping walls 36 extending outwardly and inwardly from the respective first and second sides 30 and 32 to a die face 40.

The die faces 40 of the first and second die members 12 and 14 include alternating lands 42 and grooves 44 which mate when the first and second die members engage to heat seal material such as thermoplastic polymer. A desirable land and groove configuration is illustrated in U.S. Pat. No. 4,582,555, the disclosure of which is incorporated herein by reference in its entirety. Although a land and groove configuration is desirable, it should be understood that other die face configurations such as flat surface may also be used.

Each of the first and second die members 12 and 14 have a first longitudinal bore 46 extending from one end 26 of the die member body 24 to the other end 28 proximate the die face 40. The first and second longitudinal heat tubes 20 and 22 are tightly disposed in the respective first bores 46 of the first and second die members 12 and 14. A second longitudinal bore 48 extends from the first end 26 to the second end 28 of each of the first and second die members 12 and 14 and receive the respective first and second longitudinal heating elements 16 and 18.

The first and second heat tubes 20 and 22 desirably extend the length of the first and second die members 12 and 14. Generally described, heat tubes comprised a closed metal tube such as a copper or aluminum tube. The tube contains a wick, with the remainder of the internal volume filled with a liquid under its own pressure. As the temperature along the heat tube changes, the fluid in the hotter area of the tube boils, picking up latent heat of vaporization. This high pressure gas travels to the lower pressure (cooler) area of the tube and condenses, thus transferring heat to the cooler area. This cycle in the heat tube equilibrates the temperature across the heat seal die members 12 and 14 and keeps such temperature substantially uniform. The heat tube suitable for any particular embodiment of this invention depends on the desired temperature range of the heat seal die and the length of the heat seal die. The heat seal tubes 20 and 22 can be chosen to limit the temperature variation across the length of the die members 12 and 14 as desired. It is often desirable to keep the temperature variation across the length of the die members 12 and 14 less than 10° F. and even more desirably less than 5° F. Although the temperature of the die members 12 and 14 will vary depending on the particular heat sealable material being sealed, the temperature normally ranges from 200° to 400° F.

Suitable heating elements 16 and 18 include a variety of conventional heating elements. A particularly desirable heating element is a heating cartridge which fits tightly within the second bores 48 of the first and second die members 12 and 14.

Figure 2:
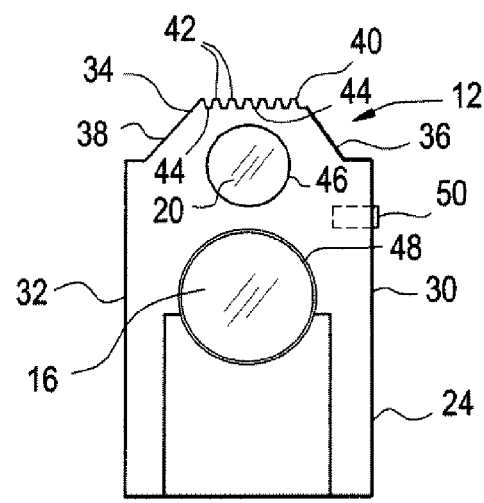
FIG. 2 is an end view of one die member illustrated in FIG. 1.

As shown in FIG. 2, the heat seal die 10 also comprises a temperature sensor 50 disposed in the first side 30 of each die member 12 and 14. A thermocouple is one suitable temperature sensor. Desirably, the temperature sensor 50 is disposed in the first side of each die member 12 and 14 because this side faces downwardly during operation of the heat seal die 10. Accordingly, when the heat seal die 10 is washed with water, as is sometimes necessary, the water flows over the heat seal die without cooling the first side 30 of the die members and therefore does not affect the temperature sensor. Washing of the heat seal die 10 only cools the outer surface of the heat seal die and if the water contacts the area of the heat seal die near the temperature sensor, it can cause the temperature sensor to give a false reading.

Figure 3:
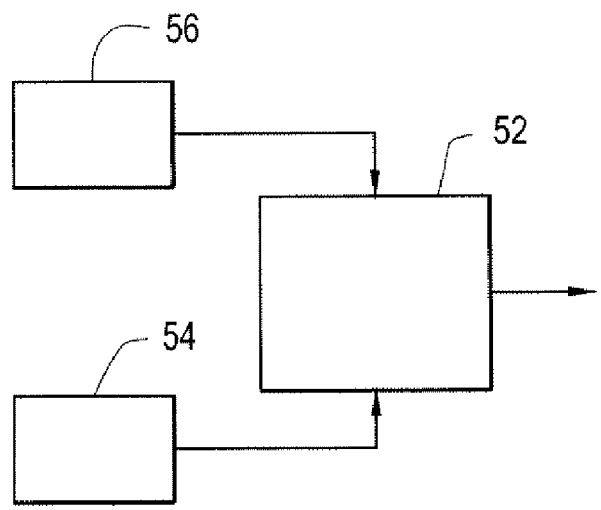
FIG. 3 is a schematic diagram of a form/fill/seal system in accordance with an embodiment of this invention.

The heat seal die 10 is particularly suitable for heat sealing a laminate of film, foil, and thermoplastic sealant in a conventional form/fill/seal packaging unit 52 as illustrated in the schematic diagram in FIG. 3. A film feeder 54 feeds heat sealable laminate to the form/fill/seal unit 52 between the opposing die faces 40 of the heat seal die 10. A flowable material feeder 56 delivers flowable material for the packaging to the form/fill/seal unit 52. The unit 52 is useful for packaging of variety of flowable materials including liquids, sauces, purees, jells, pastes, and in particular, condiments, such as mustard, ketchup, and relish. This system is particularly suitable for packaging portions within the range of one to five ounces each.

Figure 4:
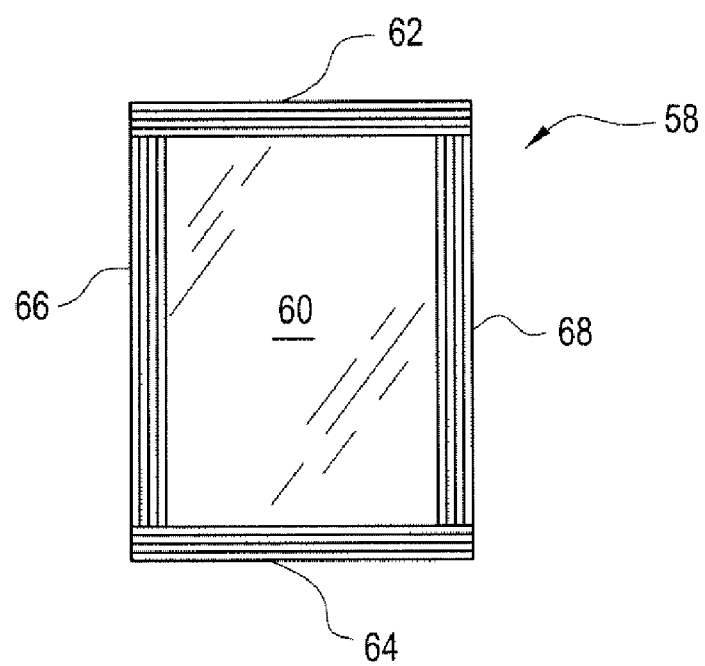
FIG. 4 is a plan view of a heat sealed package formed in accordance with an embodiment of this invention.

The packaging system of this invention produces sealed flexible packages 58 such as illustrated in FIG. 4. Each package 58 comprises a heat sealable packaging material 60 with a top seal 62, a bottom seal 64, and side seals 66 and 68 formed by the heat seal die 10 and the form/fill/seal unit 52. As the heat sealable packaging material passes between the opposing die faces 40, the heat seal die 10 forms the top heat seal edge of one package and the bottom heat seal edge of another package. A knife housed in the form/fill/seal unit 52 separates the two packages by severing the film just after the heat seals are formed.

The described embodiment reduces the occurrences of serum leakers in portion controlled sized packages. Serum leakers are packages which leak liquid through the package heat seal.

It should be understood that the foregoing relates to particular embodiments of the present invention, and that numerous changes may be made without departing from the scope of the invention as defined in the following claims.

We claim:

1. A system for making portion control sized packaged flowable liquid-containing condiments in a portion size in the range from 1 to 5 ounces comprising:
   a heat sealable material feeder;
   a flowable material feeder for feeding a flowable liquid-containing condiment; and
   a form/fill/seal apparatus structured and arranged for receiving the heat sealable material, forming a portion control sized package with the heat sealable material, filling the portion control sized package with the flowable liquid-containing condiment in a portion size in the range from 1 to 5 ounces, and sealing the portion control sized package so that the portion control sized package has a portion size in the range from 1 to 5 ounces, the form/fill/seal apparatus including a heat seal die comprising:
   a first die member having a longitudinal axis and a die face;
   a second die member having a longitudinal axis and a die face;
   a first heating element engaged with the first die member for heating the first die member;
   a second heating element engaged with the second die member for heating the second die member;
   a first longitudinal heat tube tightly disposed in a first longitudinal bore in the first die member between the first heating element and the die face of the first die member for maintaining a substantially uniform heat seal temperature along the die face of the first die member; and
   a second longitudinal heat tube tightly disposed in a first longitudinal bore in the second die member between the second heating element and the die face of the second die member for maintaining a substantially uniform heat seal temperature along the die face of the second die member.

2. A system as in claim 1 wherein the die face of the first die member has at least one longitudinal land and the second die member has at least one longitudinal groove for receiving the at least one longitudinal land in a mating arrangement.

3. A system as in claim 1 wherein the die face of the first die member has a plurality of alternating lands and grooves and the die face of the second die member has a plurality of alternating lands and grooves, the lands and grooves of the first die member and the lands and grooves of the second die member structured and arranged for selective mating arrangement.

4. A system as in claim 1 wherein:
   the first die member extends along the longitudinal axis of the first die member from a first end to a second end and the first longitudinal heat tube extends from the first end of the first die member to the second end of the first die member; and
   the second die member extends along the longitudinal axis of the second die member from a first end to a second end and the second longitudinal heat tube extends from the first end of the second die member to the second end of the second die member.

5. A system as in claim 1 wherein:
   the first die member has first and second longitudinal sides and a raised portion extending from between the first and second longitudinal sides, the raised portion of the first die member including the die face of the first die member and sloping walls extending from respective first and second sides to the die face of the first die member; and
   the second die member has first and second longitudinal sides and a raised portion extending from between the first and second longitudinal sides, the raised portion of the second die member including the die face of the second die member and sloping walls extending from respective first and second sides to the die face of the second die member.

6. A system as in claim 1 wherein:
   the first die member has an upwardly facing first longitudinal side, a downwardly facing second longitudinal side, and a temperature sensor disposed in the downwardly facing second longitudinal side; and
   second first die member has an upwardly facing first longitudinal side, a downwardly facing second longitudinal side, and a temperature sensor disposed in the downwardly facing second longitudinal side.

7. A system as in claim 1 wherein the first heating element is a heating cartridge disposed in a second longitudinal bore in the first die member and the second heating element is a heating cartridge disposed in a second longitudinal bore in the second die member.

8. A method for making portion control sized packaged flowable liquid-containing condiments in a portion size in the range from 1 to 5 ounces comprising:

- feeding heat sealable material and a flowable liquid-containing condiment to a form/fill/seal apparatus structured and arranged for making portion control sized packages of the condiment in a portion size in the range from 1 to 5 ounces and comprising a heat seal die;
- forming a portion control sized package with the heat sealable material;
- filling the portion control sized package with the flowable liquid-containing condiment in a portion size in the range from 1 to 5 ounces; and
- sealing the portion control sized package with the heat seal die so that the portion control sized package has a portion size in the range from 1 to 5 ounces, the heat seal die comprising:

- a first die member having a longitudinal axis and a die face;
- a second die member having a longitudinal axis and a die face;
- a first heating element engaged with the first die member for heating the first die member;
- a second heating element engaged with the second die member for heating the second die member;
- a first longitudinal heat tube tightly disposed in a first longitudinal bore in the first die member between the first heating element and the die face of the first die member for maintaining a substantially uniform heat seal temperature along the die face of the first die member; and
- a second longitudinal heat tube tightly disposed in a first longitudinal bore in the second die member between the second heating element and the die face of the second die member for maintaining a substantially uniform heat seal temperature along the die face of the second die member.

9. A method as in claim 8 wherein the die face of the first die member has a plurality of alternating lands and grooves and the die face of the second die member has a plurality of alternating lands and grooves, the lands and grooves of the first die member and the lands and grooves of the second die member structured and arranged for selective mating arrangement.

10. A method as in claim 8 wherein the die face of the first die member has at least one longitudinal land and the second die member has at least one longitudinal groove for receiving the at least one longitudinal land in a mating arrangement.

11. A method as in claim 8 wherein:

the first die member extends along the longitudinal axis of the first die member from a first end to a second end and the first longitudinal heat tube extends from the first end of the first die member to the second end of the first die member; and the second die member extends along the longitudinal axis of the second die member from a first end to a second end and the second longitudinal heat tube extends from the first end of the second die member to the second end of the second die member.

12. A method as in claim 8 wherein:

the first die member has first and second longitudinal sides and a raised portion extending from between the first and second longitudinal sides, the raised portion of the first die member including the die face of the first die member and sloping walls extending from respective first and second sides to the die face of the first die member; and the second die member has first and second longitudinal sides and a raised portion extending from between the first and second longitudinal sides, the raised portion of the second die member including the die face of the second die member and sloping walls extending from respective first and second sides to the die face of the second die member.

13. A method as in claim 8 wherein:

the first die member has an upwardly facing first longitudinal side, a downwardly facing second longitudinal side, and a temperature sensor disposed in the downwardly facing second longitudinal side; and second first die member has an upwardly facing first longitudinal side, a downwardly facing second longitudinal side, and a temperature sensor disposed in the downwardly facing second longitudinal side.

14. A method as in claim 8 wherein the first heating element is a heating cartridge disposed in a second longitudinal bore in the first die member and the second heating element is a heating cartridge disposed in a second longitudinal bore in the second die member.

* * * * *